United States Patent
Rajendran

(10) Patent No.: US 8,682,269 B1
(45) Date of Patent: Mar. 25, 2014

(54) METHOD, SYSTEM AND APPARATUS FOR COUPLING MULTIPLE RADIO RECEIVERS TO A RECEIVING ANTENNA

(71) Applicant: Texas Instruments Incorporated, Dallas, TX (US)

(72) Inventor: Gireesh Rajendran, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 13/723,884

(22) Filed: Dec. 21, 2012

(51) Int. Cl.
  *H04B 1/16* (2006.01)
(52) U.S. Cl.
  USPC .......................... 455/136; 455/232.1; 455/334
(58) Field of Classification Search
  USPC .................. 455/132, 133, 136, 232.1, 334
  See application file for complete search history.

(56) References Cited

U.S. PATENT DOCUMENTS

| | | | | |
|---|---|---|---|---|
| 7,266,361 B2* | 9/2007 | Burdett | ...................... | 455/334 |
| 8,121,564 B2* | 2/2012 | Behzad | ...................... | 455/132 |
| 8,320,857 B2* | 11/2012 | Kyranas et al. | ............... | 455/130 |
| 8,467,750 B2* | 6/2013 | Chehrazi et al. | ........... | 455/127.2 |
| 2007/0207756 A1* | 9/2007 | Qi et al. | ...................... | 455/226.1 |
| 2008/0139123 A1* | 6/2008 | Lee et al. | ..................... | 455/63.1 |

* cited by examiner

*Primary Examiner* — Blane J Jackson
(74) *Attorney, Agent, or Firm* — Ronald O. Neerings; Wade James Brady; Frederick J. Telecky, Jr.

(57) ABSTRACT

A first radio receiver may be configured to receive an RF signal from an RF port and may comprise a first cascode amplifier configured to provide a primary RF signal on a primary path for processing by the first RF receiver and a bypass RF signal on a bypass path. A second radio receiver may be configured to receive a sum of the bypass RF signal and an amplified primary RF signal. As a result, the second radio receiver is coupled to the same RF port and the signal received by the second receiver is maintained constant irrespective of the RF signal current drawn by the first receiver. The product of the impedance of the tuned load of the first radio receiver and the gain of the amplifier amplifying the primary RF signal is set to unity.

20 Claims, 5 Drawing Sheets

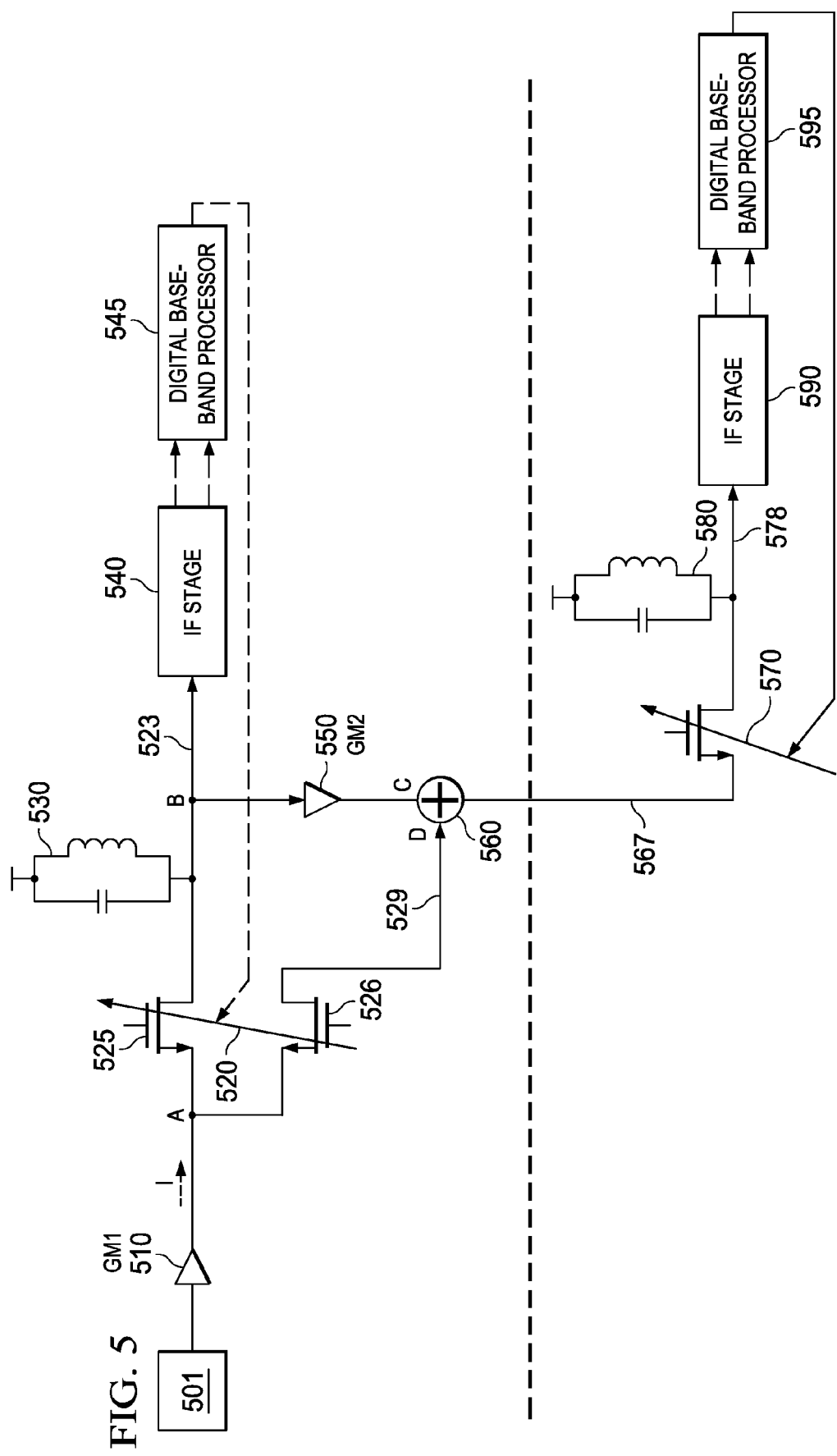

METHOD, SYSTEM AND APPARATUS FOR COUPLING MULTIPLE RADIO RECEIVERS TO A RECEIVING ANTENNA

TECHNICAL FIELD

The present disclosure relates generally to RF receivers and more specifically to a method, system and apparatus for coupling multiple radio receivers to a receiving antenna.

RELATED ART

Often a radio receiver (also referred to as "radio") is configured to receive an RF (Radio Frequency) signal through an RF antenna and an RF front-end. Generally, the RF front-end comprises a low noise amplifier followed by cascode stages and a tuned load. The low noise amplifier is often implemented as a trans-conductance amplifier with one or more cascode stages that may be programmed to adjust the gain based on the signal quality/strength. The gain of the trans-conductance amplifier in general, is adjusted to ensure that the received RF signal does not saturate the amplifier, as saturation leads to non-linearity in the amplified signal, as is well known in the art. Each receiver may adjust the gain of the cascode stages in accordance with the signal quality measured at any stage of the signal receiver chain such as, after the decoding of the signal and based on the measured bit error rate, for example. The tuned load provides desired load to the amplifier at a desired frequency band and/or provides a matching load to the receiving RF antenna connected to the RF front-end.

Often, multiple receivers, each receiving different RF signal in a same frequency range/spectrum are coupled to one receiving RF antenna/node/port. For example, a Bluetooth receiver and WLAN receiver operating in a free band of 2.4 to 2.5 GHz may be deployed on a single chip (integrated circuit). Thus, one or more radios may be coupled to the same RF antenna.

SUMMARY

According to an aspect of the present disclosure, a first radio receiver may be configured to receive an RF signal from an RF port. The first radio receiver may comprise a first cascode amplifier that is configured to provide a primary RF signal on a primary path for processing by the first RF receiver and a bypass RF signal on a bypass path. A second radio receiver may be configured to receive the sum of the bypass RF signal and an amplified primary RF signal. As a result, the second radio receiver is coupled to the same RF port as is the first radio receiver and the signal received by the second receiver is maintained constant irrespective of the RF signal current drawn by the first receiver.

According to another aspect of the present disclosure, the product of the impedance of the tuned load of the first radio receiver and the gain of the amplifier amplifying the primary RF signal is set to unity.

Several aspects are described below, with reference to diagrams. It should be understood that numerous specific details, relationships, and methods are set forth to provide a full understanding of the present disclosure. One skilled in the relevant art, however, will readily recognize that the present disclosure can be practiced without one or more of the specific details, or with other methods, etc. In other instances, well-known structures or operations are not shown in detail to avoid obscuring the features of the present disclosure.

BRIEF DESCRIPTION OF THE DRAWINGS

FIG. 5 illustrates an example arrangement for coupling multiple receivers to an antenna, according to one embodiment.

DETAILED DESCRIPTION

Figure 1:
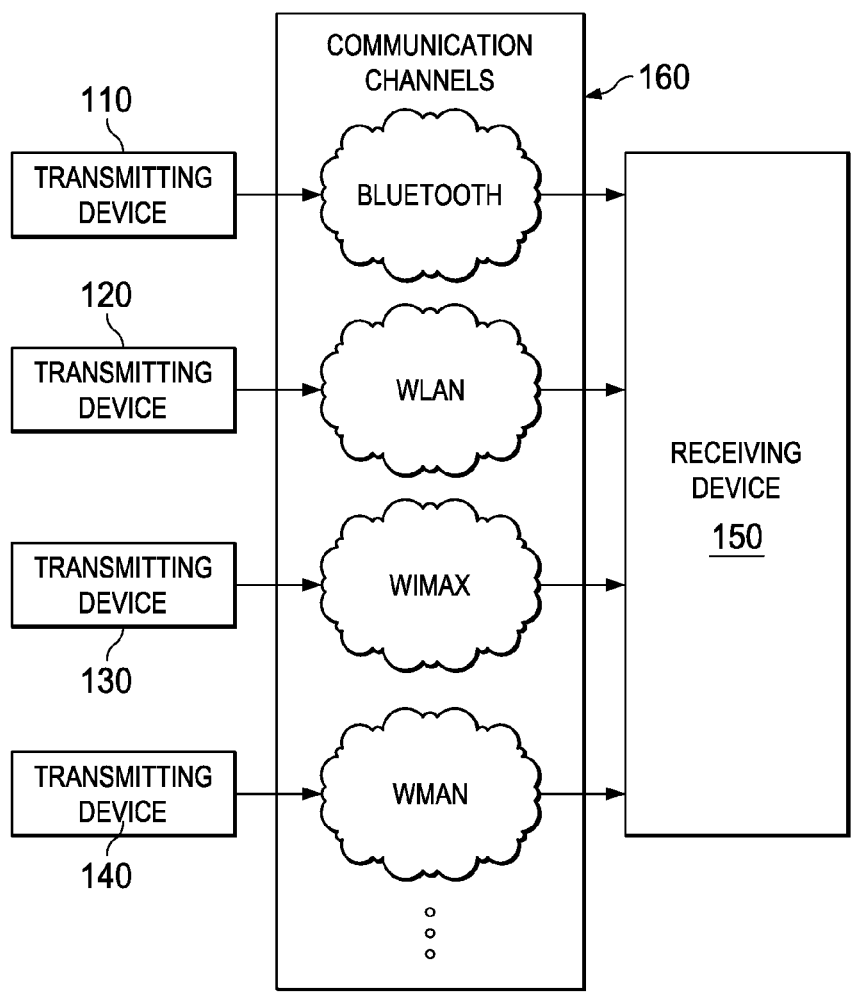
FIG. 1 is an example environment in which various aspects of a receiving device according to one embodiment of the present disclosure may be seen.

FIG. 1 is an example environment in which various aspects of a receiving device according to one embodiment of the present disclosure may be seen. As shown, the environment may comprise, for example, one or more wireless transmitting devices 110-140 and a receiving device 150. The transmitting devices 110-140 and the receiving device 150 may comprise devices such as and not limited to laptop, desktops, mobile devices, base stations, multi-channel receiver ICs (Integrated circuits) and handheld devices, for example. Each transmitting device transmits data on one or more wireless communication channels 160 that may be confined to one or more particular frequency bands and/or modulation techniques. For example and as shown in FIG. 1, transmitting device 110 may transmit data on a Bluetooth channel at a frequency range 2.4 to 2.5 GHz according to a modulation technique specified in the Bluetooth standard. Similarly, devices 120-140 may transmit data using modulation techniques specified in the WLAN, WMAX, and WMAN standards or protocols respectively. Other communication channels, standards or protocols may be implemented. Each transmitting device 110-140 may transmit data in substantially same frequency range.

The receiving device 150 may be configured to receive signals from one or more transmitting device 110-140. The receiving device 150 may use the data received from each transmitting device 110-140 to provide the user with a unified functionality. The manner in which receiver device 150 may be implemented to receive multiple RF signals transmitted over multiple radio channels is described in further detail below.

Figure 2:
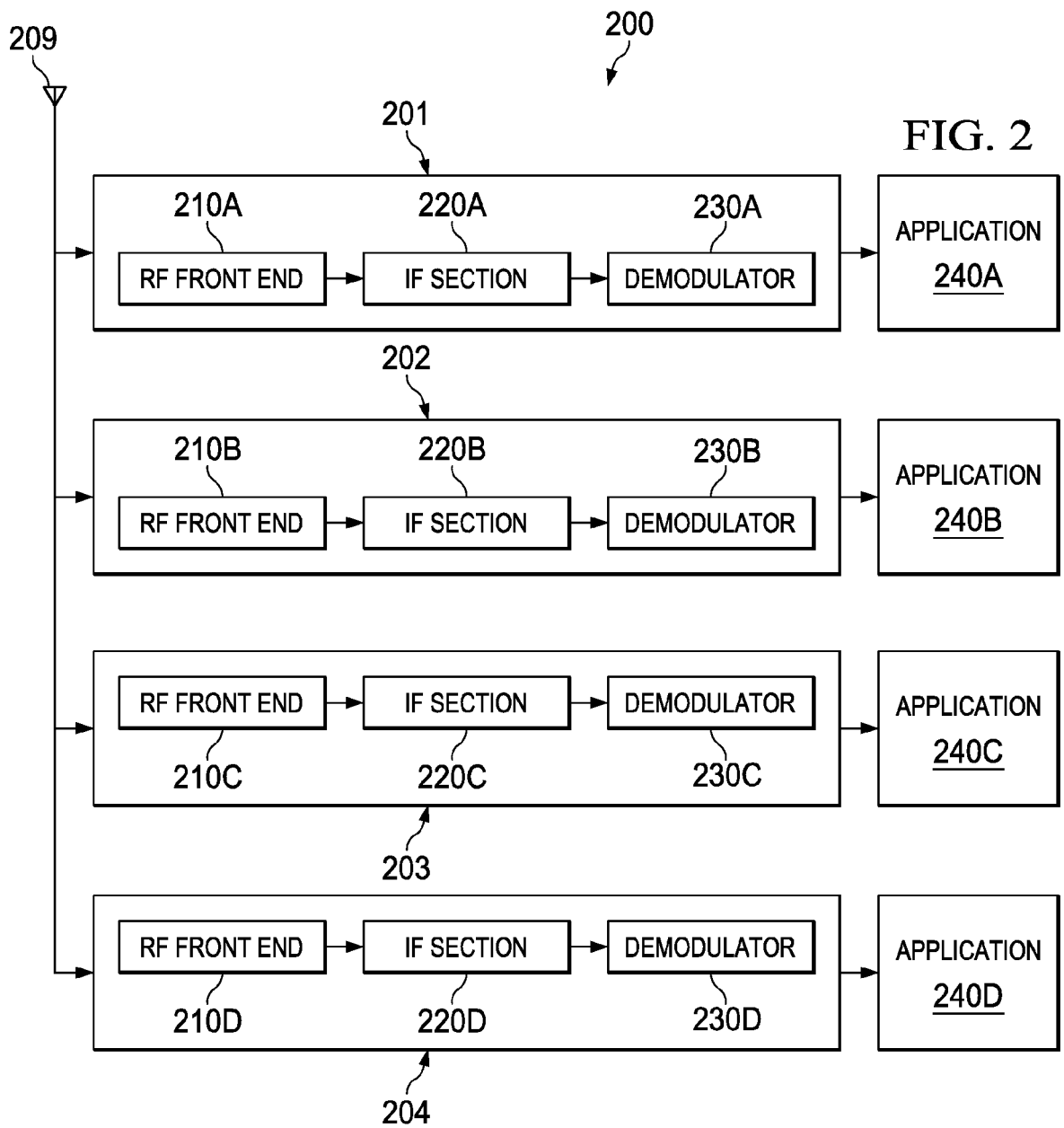
FIG. 2 is block diagram of receiving device of FIG. 1, according to one embodiment.

FIG. 2 is block diagram of an embodiment of receiving device of FIG. 1. The receiving device 200 is shown comprising an antenna 209, radios (RF receivers) 201 through 204 and applications 240A through 240D. The radios 201 through 204 may be configured to receive signals transmitted using different protocols. For example, the receiver 201 may be configured to receive the signal modulated and transmitted according to the Bluetooth standard. Similarly, the radios 202 through 204 may be configured to receive the signal modulated and transmitted in accordance with WLAN, WiMAX, and WMAN protocols, respectively. Each radio 201 through 204 may extract data by performing a corresponding demodulation and decoding technique. The extracted data may be provided to the applications 240A through 240D respectively. Applications 240A through 240D may be configured to use data from the radios 201 through 204 respectively and to provide the user with a desired functionality.

Each radio 201 through 204 is shown comprising an RF front-end 210A through 210D, an intermediate frequency (IF) stage 220A through 220D and a demodulator 230A through 230D. Each exemplary block is described in further detail below.

IF stage 220A through 220D may be configured to convert the RF signal to a base-band signal. The RF signal may be converted to an intermediate frequency (IF) before being converted to a base-band signal. The IF stages may be implemented with mixers and other signal processing elements such as amplifiers, buffers, filters etc. In one alternative embodiment, the IF signal or the base-band signal may be digitized and the resultant digital signal may be provided to demodulator 230 for demodulation and extraction of the information encoded therein.

Demodulators 230A through 230D respectively may be configured to demodulate the base-band signal received from IF stages 220A-220D using a corresponding demodulation technique. The demodulators may comprise an automatic gain control (AGC) stage that is configured to adjust the gain of the amplifier in the RF front-end. Demodulators 230A through 230D may be further configured to decode and extract the data/information from the demodulated signal. The demodulated signal/extracted data or information may be provided to the applications 240A through 240D. The demodulators 230A through 230D and/or IF stage 220A through 220D may be configured to control or provide feedback to the respective RF front-ends 210A through 210D. The gain may be controlled through AGC stages implemented within the demodulators 230A-230D.

Each RF front-end 210A-210D may be configured to receive RF signal in the desired frequency band (for example, in this case, the frequency range of the transmitting devices 110-140). Each RF front-end 210A-210D may receive the RF signal through the antenna 209 (or through an RF port coupled to the antenna 209) and may amplify the RF signal to a suitable level for further processing. An RF front-end adjust amplification factor may be based on the feedback received from respective demodulators 230A through 230D and/or IF stage 220A through 220D. Each RF front-end may be coupled to the antenna 209/RF port.

The conventional manner in which more than one radio may be coupled to a single antenna is described below with reference to FIG. 3.

Figure 3:
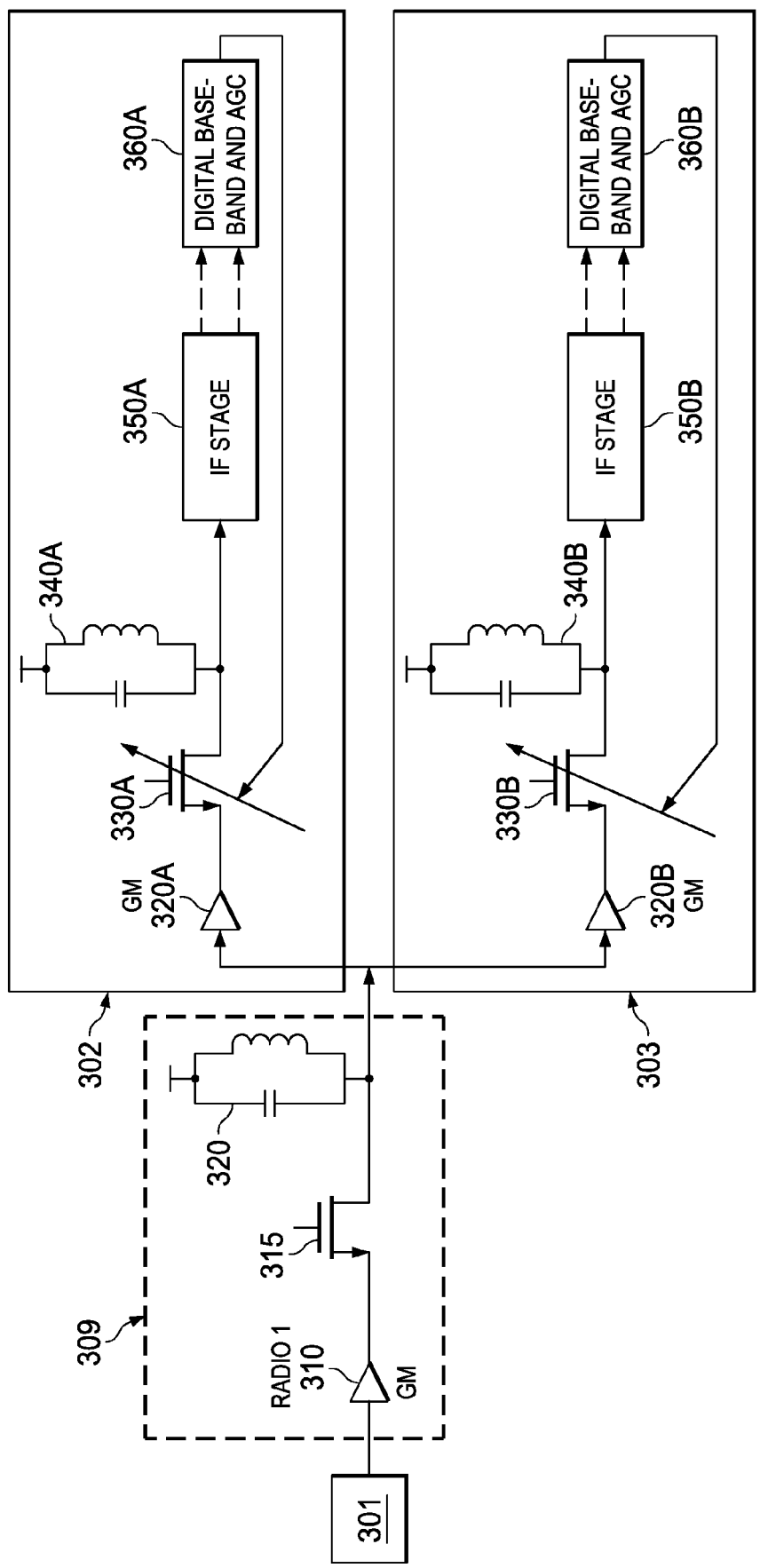
FIG. 3 illustrates a conventional receiving device.

FIG. 3 illustrates a conventional receiving device comprising a common RF front end 301 followed by the two receiver sections 302 and 303. The common RF front end 301 is shown coupled to antenna/RF port 309. As shown, the common RF front end 301 comprises a fixed gain trans-conductance amplifier (gm amplifier) 310, a cascode stage 315 and a tuned load 318. The common RF front end 301 may be configured to provide a tuned load (tuned for desired frequency range) and fixed gain amplification to the received RF signal. As shown in FIG. 3, the amplified RF signal is provided to radios 302 and 303. Each radio 302 and 303 is further shown with variable low noise amplifier (gm) 320A and 320B, cascode stages 330A and 330B, tuned loads 340A and 340B, IF stages 350A and 350B and AGC stages 360A and 360B. Each receiver 302 and 303 adjust the gain through the AGC coupled to the cascode stages of the respective variable gain LNA 320A and 320B.

However, such implementation may cause a non-linearity in the received RF signal in the common RF front end 301 due to use of a constant gain amplifier and further, such implementation uses additional set of elements such as an LNA and load thereby rendering the receiver inefficient at least in terms of power and space.

The manner in which multiple radios (for example, 201 through 204) may be coupled to single antenna according to present disclosure may overcome at least some of the conventional limitations is described in further detail below.

Figure 4:
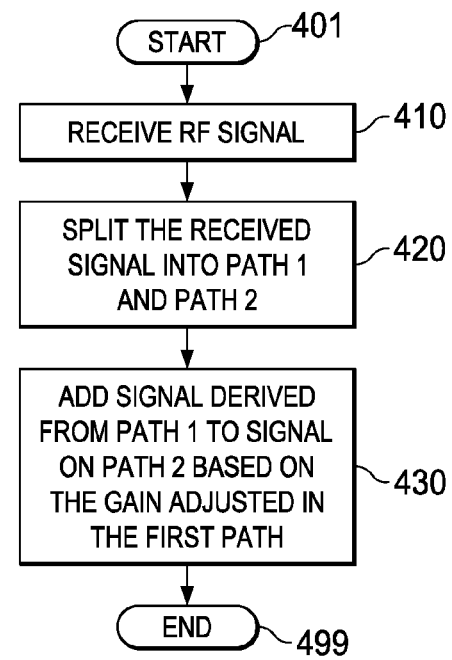
FIG. 4 is a flowchart illustrating coupling of multiple receivers to RF signal path, according to one embodiment.

FIG. 4 is a flowchart illustrating the coupling of multiple receivers to an RF signal path, according to one embodiment. The flowchart begins in block 401 and control is transferred to block 410.

In block 410, the antenna in the receiving device 150 receives an RF signal. The antenna may be configured to receive an RF signal of a particular frequency band by adjusting the physical parameters. The received RF signal may be coupled to an RF port through conductive means such as copper wire, matching circuits, etc. The antenna may be implemented on an integrated circuit or may be provided external to integrated circuit.

In block 420, the received RF signals may be split and fed to two paths; namely, path 1 and path 2. The RF signal may be split in terms of the current, voltage and/or power of the RF signal. The split may be performed based on the signal type. For example, if the RF signal is in the form of a current, the current may be split into two conductive paths. The signal on path 1 may be provided to a first receiver and signal on path 2 may be provided to a second receiver. The ratio of the split may be controlled by the first receiver. In this manner, the first receiver may be configured to dynamically adjust the signal strength on path 1.

In block 430, a signal derived from path 1 based on the signal strength on path 1 may be added to the signal on path 2. The signal may be derived from path 1 by way of connecting an amplifier between path 1 and path 2, for example. Due to addition of the signal derived from path 1, the signal strength on path 2 is maintained at a constant level irrespective of the adjusted signal strength on path 1. The flowchart ends in Block 499. Several aspects of the present disclosure are further described below.

FIG. 5 illustrates an exemplary arrangement for coupling multiple receivers to an antenna, according to one embodiment. The arrangement is shown comprising an RF port 501, trans-conductance amplifiers (gm) 510 and 550, cascode stages 520 and 570, tuned loads 530 and 580, IF stages 540 and 590, digital base-band processors 545 and 595, and an adder 560. Each such component is described below in further detail.

As shown in FIG. 5, trans-conductance amplifier (gm) 510 may be configured to receive the RF signal from RF port 501 and amplifies the RF signal. The trans-conductance amplifier (gm) 510 converts the RF signal voltage to current (hereafter referred to as RF signal current). The amplified RF signal current is provided to variable gain cascode stage 520. The cascode stage 520 is shown comprising transistors 525 and 526. By adjusting the gain of the cascode amplifier 520, the cascode amplifier controls the current flow by passing desired current through transistor 525 and the excess current through transistor 526. Accordingly, by adjusting the gain, a larger portion of the RF signal current is fed to the path 523 through transistor 525 and a leakage current or a bypass current is fed to path 529 through transistor 526.

The tuned load 530 may provide a desired load to the trans-conductance amplifier 550 in a desired frequency range. In one embodiment, the desired frequency range includes the frequency range of both first receiver and second receiver. Thus, the frequency components of the RF signal on path 523 and on path 578 are substantially same. The tuned load 530 may develop an RF voltage proportional to the current received on path 523 at point B.

Trans-conductance amplifier (gm2) 550 may be configured to amplify and convert the RF voltage at point B to an RF signal current. The gain (gm2) of the trans-conductance amplifier 550 may be adjusted based on the impedance (Zp) of the tuned load 530. In one embodiment, the gain gm2 may be adjusted such that the product Zp×Gm2 is unity. The amplified RF signal current output from the trans-conductance amplifier 550 may then be provided to the adder 560. The adder 560 may add or sum the RF signal current passed through transistor 526 and the RF signal current provided at the output from the trans-conductance amplifier 550. The summed RF signal current is then provided to cascode stage 570. The current on the path 578 may be controlled by controlling the gain of the cascode stage 570.

IF stages 540 and 590 may be configured to convert the RF frequency signals to intermediate frequency range. The IF stage may employ one or more signal processing elements such as trans-conductance amplifier, mixer, filters, for example. Each IF stage 540, 590 may digitize the IF signal and provide digitized IF signal to base-band processors 545 and 595 respectively.

Base-band processors 545 and 595 may be configured to convert the IF signal to base-band signals and may demodulate the base-band signal to extract information encoded therein. Base-band processors 545 and 595 control the respective gains of cascode amplifiers 520 and 560. Each base-band processor 545 and 595 may employ one or more digital processors to process/demodulate the signal and an AGC to control the gain of the cascode amplifier 520 and 570, respectively. Thus, IF stage 590 or Base-band processor 595 may be configured to control the gain of the cascode stage 570.

According to one embodiment, the trans-conductance amplifier 510, cascode stage 520, tuned load 530, IF stage 540 and base-band processor 545 may be configured to operate as a first radio configured to receive a first radio signal. According to one embodiment, the trans-conductance amplifier 550, cascode stage 570, tuned load 580, IF stage 590 and base-band processor 595 may be configured to operate as a second radio configured to receive a second radio signal. Thus, according to one embodiment, both the radios may be coupled to an antenna through an RF port 501 without necessitating an additional common front end and each of the first and second radios may be configured to control the gain independently.

Due to the arrangement of the receivers shown in and described relative to FIG. 5, changing the gain of cascode amplifier 520 by the first receiver may not affect the signal feed to the second receiver/radio. FIG. 5 is further described with an exemplary RF signal current i at the output of trans-conductance amplifier 510 (point A).

According to one embodiment, the base-band processor 545 may be configured to adjust the gain of the cascode stage 570 and to draw an RF signal current to the tuned load 530 (at point B). Thus, the RF signal current on path 523 or at point B may be equal to $i_o$. The difference current $i-i_o$ is passed/bypassed through the transistor 526 to the adder 560 (at point D). The tuned load 530 may cause an RF signal voltage $i_o*Z_p$ to develop at point B due to the current $i_o$, wherein $Z_p$ is the impedance of the tuned load 530 and symbol * indicates the multiplication operation.

The trans-conductance amplifier 550 may be configured to convert the voltage developed at its input $i_o*(Z_p)$ to a current value $i_o*Z_p*g_{m2}$. The current $i_o*Z_p*g_{m2}$ may then be provided to the adder 560. The adder 560 may be configured to adds the two currents $i-i_o$ and $i_o*Z_p*g_{m2}$. Thus, the total RF signal current on path 567 may be represented as: $(i-i_o)+$ $(i_o*Z_p*g_{m2})$. The product $Z_p*g_{m2}$ may be configured to a value equal to unity. Thus, the output of the adder 560 becomes i, which may be independent of $i_o$. Thus, each receiver may adjust the gain of its respective cascode stage (amplifier) 520, 570 without affecting the signal strength in the other receiver.

Figure 6:
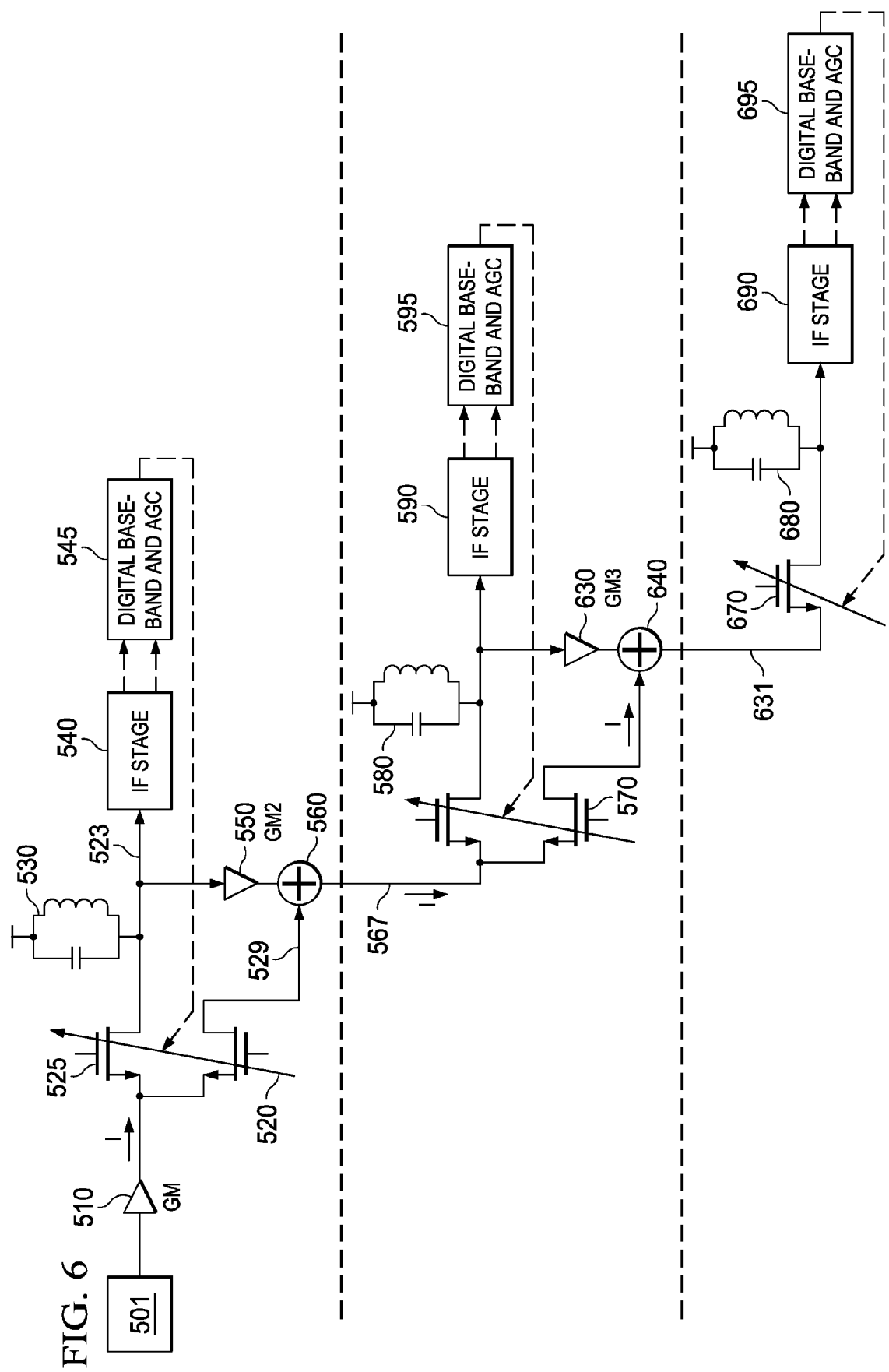
FIG. 6 illustrates the manner in which the additional receivers may be added to the arrangement of FIG. 5, according to one embodiment.

The manner in which the additional receivers may be added to the arrangement of FIG. 5, according to one embodiment, is illustrated in FIG. 6. As shown therein, the trans-conductance amplifier (gm3) 630, the cascode stage 670, the tuned load 680, the IF stage 690 and digital base-band processor 695 may be configured to operate as a third radio or receiver configured to receive a third radio signal. The RF signal to the third receiver may be derived from the second receiver, in the same manner that the RF signal to the second receiver may be derived from the first receiver. For example, the leakage current/bypass current of the cascode stage 570 may be added (using adder 640) to the current derived from trans-conductance amplifier 630 to form a constant RF signal current i on path 631.

The remaining elements of FIG. 6 are not described herein to avoid repetitiveness and are apparent to a person of ordinarily skilled in the art by reading the disclosure provided herein. Thus, a constant RF signal current is provided to all the receiver sections and each receiver may be configured to adjust its gain without affecting the signal feed to other receivers.

While various examples of the present disclosure have been described above, it should be understood that they have been presented by way of example, and not limitation. Thus, the breadth and scope of the present disclosure should not be limited by any of the above-described examples, but should be defined in accordance with the following claims and their equivalents.

What is claimed is:

1. An integrated circuit comprising:
a first radio receiver configured to receive an RF signal from an RF port, wherein the first radio receiver comprises a first cascode amplifier configured to provide a primary RF signal on a primary path and a bypass RF signal on a bypass path; and
a second radio receiver configured to receive a summed RF signal corresponding to a sum of the bypass RF signal and an amplified primary RF signal.

2. The integrated circuit of claim 1, further comprising a second cascode amplifier comprising a second trans-conductance amplifier with a second cascode stage, wherein the primary RF signal is amplified by the second trans-conductance amplifier with a second gain to generate the amplified primary RF signal.

3. The integrated circuit of claim 2 further comprising an adder configured to add the bypass RF signal and the amplified primary RF signal to generate the summed RF signal.

4. The integrated circuit of claim 3, wherein the first radio receiver further comprises a first tuned load offering a first impedance at a first frequency range coupled to the primary path of the first cascode amplifier.

5. The integrated circuit of claim 4, wherein a product of the second gain and the first impedance is unity.

6. The integrated circuit of claim 5, wherein the first radio receiver comprises a first automatic gain controller, configured to control again of the first cascode amplifier.

7. The integrated circuit of claim 6, wherein the second radio receiver comprises a second automatic gain controller, configured to control again of the second cascode stage.

8. The integrated circuit of claim 7, wherein the first radio receiver comprises a first RF signal processor configured to process the RF signal according to a first protocol.

9. The integrated circuit of claim 8, wherein the second radio receiver comprises a second RF signal processor configured to process the RF signal according to a second protocol.

10. The integrated circuit of claim 9, wherein the first frequency range comprises an RF frequency range of the first and second radio receivers.

11. The integrated circuit of claim 10, wherein the RF port is coupled to an RF receiving antenna that is configured to receive the RF signal in the first frequency range.

12. A method of coupling a plurality of radio frequency (RF) receivers to an RF signal, comprising:
    splitting the RF signal into a first path RF signal and a second path RF signal;
    deriving a compensation RF signal equal to the first path RF signal;
    adding the compensation RF signal and the second path RF signal to form a constant RF signal; and
    coupling the first path RF signal to a first RF receiver and coupling the constant RF signal to a second RF receiver, wherein a ratio of a power of the first path RF signal and a power of the second path RF signal is controlled by the first RF receiver.

13. The method of claim 12, wherein the first path RF signal is a primary current of a cascode amplifier, wherein the second path RF signal is a bypass current of the cascode amplifier.

14. The method of claim 13, further comprises controlling a ratio of the primary current to the bypass current by controlling again of the cascode amplifier.

15. The method of claim 14, further comprises converting a voltage formed by the primary current at a first tuned load of the first receiver into a compensation current by a second trans-conductance amplifier having a second gain factor.

16. The method of claim 15, wherein a product of an impedance of the first tuned load and the second gain factor is equal to unity.

17. The method of claim 16, further comprising the second receiver controlling a gain of the second cascode amplifier coupled to the second trans-conductance amplifier.

18. A radio frequency (RF) receiver comprising:
    a first RF receiver, comprising:
    a first trans-conductance amplifier configured to convert an RF signal into an RF signal current with a first gain;
    a first cascode stage coupled to the first trans-conductance amplifier and configured to split the RF signal current into a primary RF current and a bypass RF current;
    a first Automatic Gain Control (AGC) configured to control a gain of the first cascode stage, and
    a first tuned load coupled to the output of the first cascode stage and configured to convert the primary RF current to a primary RF voltage; and
    a second RF receiver, comprising:
    a second trans-conductance amplifier configured to convert the primary RF voltage into a compensation RF current with a second gain, wherein a product of an impedance of the first tuned load and the second gain is set to unity;
    an adder configured to add the compensation RF current and the bypass RF current to form a constant RF current;
    a second cascode stage configured to receive the constant RF current; and
    a second AGC configured to control the second cascode stage.

19. The RF receiver of claim 18, wherein the first RF receiver and the second RF receiver are coupled to a receiving antenna configured to receive the RF signal.

20. The RF receiver of claim 19, wherein the first RF receiver comprises a first signal processor configured to process the RF signal according to a first protocol and the second RF receiver comprises a second signal processor configured to process the RF signal according to a second protocol.

* * * * *